US012524921B2

(12) United States Patent
Cao et al.

(10) Patent No.: US 12,524,921 B2
(45) Date of Patent: Jan. 13, 2026

(54) REPRESENTATION LEARNING FOR CONTINUOUS VECTOR GRAPHICS

(71) Applicant: ADOBE INC., San Jose, CA (US)

(72) Inventors: Defu Cao, Los Angeles, CA (US); Zhaowen Wang, San Jose, CA (US); Jose Ignacio Echevarria Vallespi, Brooklyn, NY (US)

(73) Assignee: ADOBE INC., San Jose, CA (US)

( * ) Notice: Subject to any disclaimer, the term of this patent is extended or adjusted under 35 U.S.C. 154(b) by 420 days.

(21) Appl. No.: 18/179,487

(22) Filed: Mar. 7, 2023

(65) Prior Publication Data
US 2024/0303870 A1    Sep. 12, 2024

(51) Int. Cl.
*G06T 11/00* (2006.01)
*G06T 7/155* (2017.01)
*G06T 7/60* (2017.01)
*G06T 9/00* (2006.01)

(52) U.S. Cl.
CPC .............. *G06T 9/002* (2013.01); *G06T 7/155* (2017.01); *G06T 7/60* (2013.01); *G06T 11/00* (2013.01); *G06T 2207/20044* (2013.01); *G06T 2207/20072* (2013.01); *G06T 2207/20081* (2013.01); *G06T 2207/20084* (2013.01)

(58) Field of Classification Search
CPC ........... G06T 9/002; G06T 7/155; G06T 7/60; G06T 11/00; G06T 2207/20044; G06T 2207/20072; G06T 2207/20081; G06T 2207/20084
See application file for complete search history.

(56) References Cited

U.S. PATENT DOCUMENTS

| | | | | |
|---|---|---|---|---|
| 11,853,077 B1 * | 12/2023 | Glas | ...................... | G05D 1/6482 |
| 2019/0258925 A1 * | 8/2019 | Li | .......................... | G06F 16/583 |
| 2020/0151508 A1 * | 5/2020 | Yang | ...................... | G06V 10/82 |
| 2021/0142479 A1 * | 5/2021 | Phogat | .................. | G06T 11/206 |
| 2022/0138536 A1 * | 5/2022 | Li | .......................... | G06N 3/045 |
| | | | | 706/25 |
| 2022/0405480 A1 * | 12/2022 | Huang | .................. | G06F 40/166 |

OTHER PUBLICATIONS

Blum, "A Transformation for Extracting New Descriptors of Shape", In Models of the Perception of Speech and Visual Form, pp. 362-380, 1967.

(Continued)

*Primary Examiner* — Jitesh Patel
(74) *Attorney, Agent, or Firm* — F. CHAU & ASSOCIATES, LLC

(57) ABSTRACT

Systems and methods for generating representations for vector graphics are described. Embodiments are configured to obtain semantic information and geometric information for a vector graphics image. The semantic information describes individual segments of the vector graphics image, and the geometric information describes geometric relationships among the individual segments. Embodiments are additionally configured to encode the semantic information and the geometric information to obtain a vector graphics representation for the vector graphics image, and to provide a reconstructed image based on the vector graphics representation.

17 Claims, 11 Drawing Sheets

(56) References Cited

OTHER PUBLICATIONS

Carlier, et al., "DeepSVG: A Hierarchical Generative Network for Vector Graphics Animation", arXiv preprint arXiv:2007.11301v3 [cs.CV] Oct. 22, 2020, 19 pages.
Wang, et al., "DeepVecFont: Synthesizing High-quality Vector Fonts via Dual-modality Learning", arXiv:2110.06688v1 [cs.CV] Oct. 13, 2021, 15 pages.
Wolf, et al., "Transformers: State-of-the-Art Natural Language Processing", Proceedings of the 2020 EMNLP (Systems Demonstrations), pp. 38-45, Nov. 16-20, 2020.
Zhou, et al., "Informer: Beyond Efficient Transformer for Long Sequence Time-Series Forecasting", arXiv preprint arXiv:2012.07436v3 [cs.LG] Mar. 28, 2021, 15 pages.
Vaswani, et al., "Attention Is All You Need", arXiv:1706.03762v5 [cs.CL] Dec. 6, 2017, 15 pages.

\* cited by examiner

REPRESENTATION LEARNING FOR CONTINUOUS VECTOR GRAPHICS

BACKGROUND

The following relates generally to image processing, and more specifically to encoding vector graphics images. Vector graphics are a type of computer graphics in which images are created from geometric shapes and mathematical relationships. Vector graphics files are stored in a data scheme that is based on the mathematics of coordinate geometry, which describes 2D or 3D shapes within a cartesian coordinate system. These files can be rendered, or "rasterized", at any display resolution without loss of detail since their data are not tied to a set resolution.

Images are often encoded using learned encoder models to capture their features for downstream tasks. For example, principal component analysis (PCA) methods store the bases of an image in an encoding, which may then be used to compare to other encodings for tasks such as image search, labeling, and analysis. Many encoding models are configured to process rasterized images that include tensor data including width, height, and color dimensions. However, vector graphics data is different from rasterized pixel data. There is a need in the art for models that can encode vector images, which do not contain pixel data, for downstream tasks such as classification and search.

SUMMARY

Embodiments include an image processing apparatus configured to generate representations of vector graphic images. The image processing apparatus is trained to generate representations that encode both semantic and geometric information from vector graphics files. In some examples, the image processing apparatus extracts semantic information, position information, and geometric information from raw vector graphics commands, and embeds each stream of information into a combined embedding. Then, the image processing apparatus applies geometric-self attention to the combined embedding to generate a vector graphics representation. In one example, a reconstructing decoder processes the vector graphics representation to generate reconstructed vector graphics commands that may be used to render images. Other embodiments include different decoders configured to process the vector graphics representation for various downstream tasks.

A method, apparatus, non-transitory computer readable medium, and system for encoding vector graphics images are described. One or more aspects of the method, apparatus, non-transitory computer readable medium, and system include obtaining semantic information and geometric information for a vector graphics image, wherein the semantic information describes individual segments of the vector graphics image, and the geometric information describes geometric relationships among the individual segments; encoding the semantic information and the geometric information to obtain a vector graphics representation for the vector graphics image; and providing a reconstructed image based on the vector graphics representation.

A method, apparatus, non-transitory computer readable medium, and system for encoding vector graphics images are described. One or more aspects of the method, apparatus, non-transitory computer readable medium, and system include obtaining semantic information and geometric information for a vector graphics image, wherein the semantic information describes individual segments of the vector graphics image, and the geometric information describes geometric relationships among the individual segments; encoding, using a machine learning model, the semantic information and the geometric information to obtain a vector graphics representation for the vector graphics image; decoding, using the machine learning model, the vector graphics representation to obtain decoded semantic information; comparing the semantic information and the decoded semantic information; and updating parameters of the machine learning model based on the comparison.

An apparatus, system, and method for encoding vector graphics images are described. One or more aspects of the apparatus, system, and method include a processor; a memory including instructions executable by the processor; and a vector graphics encoder configured to encode semantic information and geometric information of a vector graphics image to obtain a vector graphics representation for the vector graphics image.

DETAILED DESCRIPTION

Figure 1:
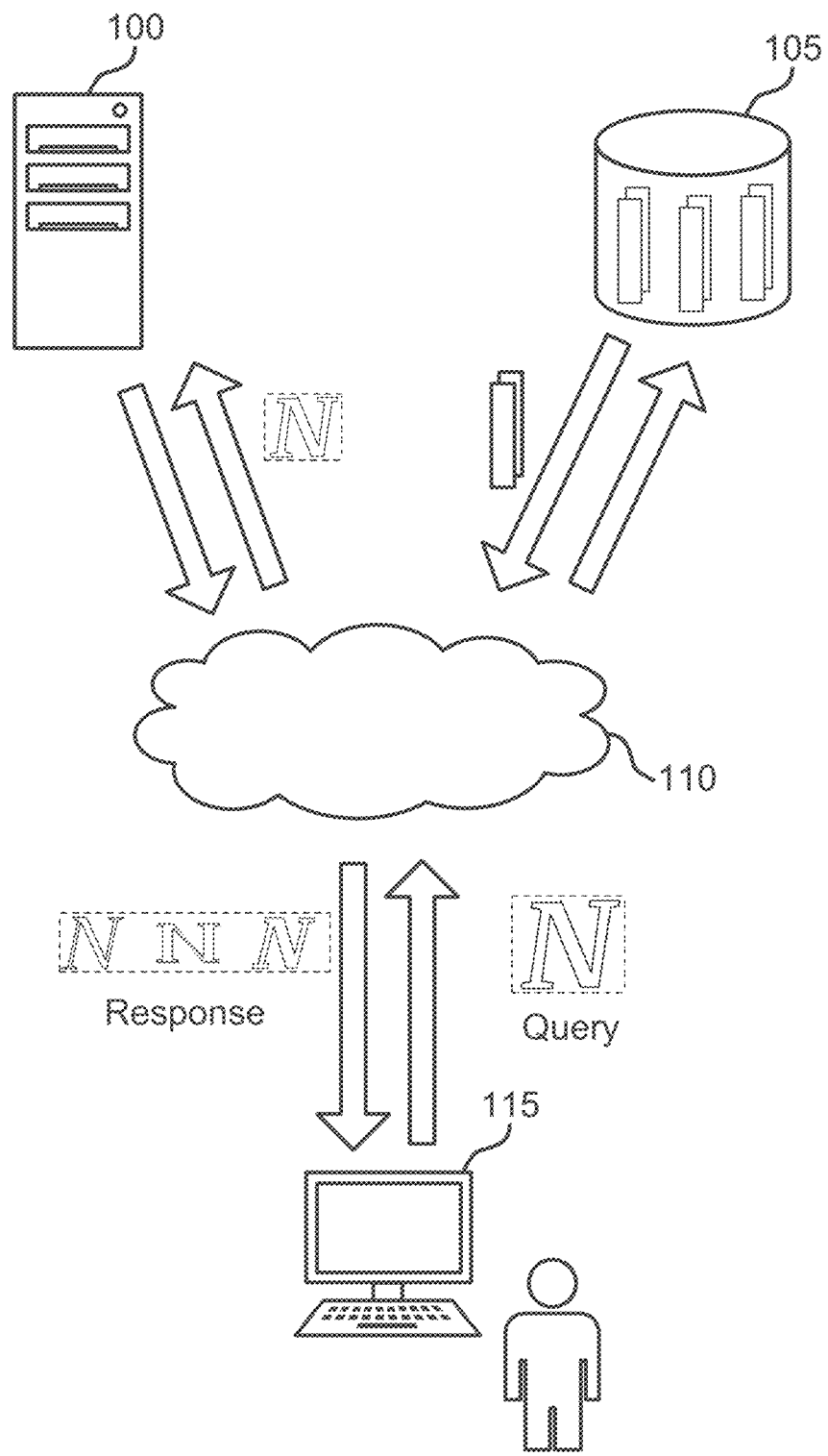
FIG. 1 shows an example of an image processing system according to aspects of the present disclosure.

Vector graphics store image data as a sequence of commands based on relative relationships between points, lines, and shapes. By contrast, rasterized image files store image data as a set of pixel values. Vector graphics are used in many domains, including presentations, infographics, and websites. Benefits of vector graphics can include smaller file sizes, and resolution-independent file data.

Image representation learning can be used for multiple downstream tasks such as image reconstruction, image classification, image search, and others. Conventional methods for image representation learning process structured bitmap images, which have pixel-level data.

Scalable vector graphics (SVG) is a common data format for vector graphics. An SVG file includes a series of commands used to reproduce an image based on shapes and their relative positions in the image. SVGs can contain a mixture of smooth and sharp features, such as lines, circles, polygons, and splines, and are presented as parametric curves in each command. Accordingly, SVGs are sequential data, and it is possible to learn compact and scale-invariant representations for SVGs using encoding models.

However, merely transforming the data into a compact encoding provides inaccurate results in downstream tasks. For example, encoding methods adapted for sequential data often use a fixed token space, whereas SVGs are parameterized by continuous values and would therefore use an infinite token space. Accordingly, some encoding methods quantize the continuous SVG parameters, which removes a significant amount of information.

Transformer based models for encoding series data achieves state-of-the-art results on time-series forecasting problems and Natural Language Processing (NLP) problems. However, these methods also utilize fixed token spaces. Furthermore, the number of commands and the correlation between commands can vary greatly across vector graphics files, which can lessen the effectiveness of purely data-driven attention mechanisms. For example, font data may vary across different families while sharing similar styles within the same font family. This property is encoded in the vector graphics files of the glyphs within the font, and is not currently leveraged by general transformer models. This property and others provide important geometric information. The general transformer models process each command without considering the geometric context, e.g., how the shapes relate to each other in the overall structure. As a result, downstream applications such as reconstruction and classification have reduced accuracy.

Embodiments of the present disclosure are configured to embed continuous sequential input from vector graphics files using a 1D (i.e., one-dimensional) convolutional embedding layer to preserve the original continuous format of the SVG data and produce a semantic information embedding. Embodiments additionally extract geometric information from the sequential input by applying a medial axis transform (MAT) to the raw commands. Embodiments further apply geometric self-attention to the combined semantic-geometric embedding to generate a vector graphics representation that captures both the semantic and geometric information, leading to increased performance in downstream tasks such as image reconstruction. Accordingly, embodiments provide an end-to-end encoder-decoder system to generate representations for continuous-data vector graphics images and to decode the representations for image reconstruction, classification, search, and other tasks.

An image processing system is described with reference to FIGS. 1-5. Methods for generating vector graphics representations and using the representations for various tasks are described with reference to FIGS. 6-9. Training methods are described with reference to FIG. 10. A computing device configured to implement an image processing apparatus is described with reference to FIG. 11.

Image Processing System

An apparatus for encoding vector graphics images is described. One or more aspects of the apparatus include a processor; a memory including instructions executable by the processor; and a vector graphics encoder configured to encode semantic information and geometric information of a vector graphics image to obtain a vector graphics representation for the vector graphics image. In some aspects, the vector graphics encoder comprises a geometric self-attention component including a graph convolution network (GCN), and wherein the geometric self-attention component is configured to adjust the vector graphics representation using the GCN.

Some examples of the apparatus, system, and method further include a decoder configured to decode the vector graphics representation into a list of reconstructed commands. Some examples further include a medial axis transform (MAT) component configured to perform MAT on the semantic information to obtain the geometric information.

Some examples of the apparatus, system, and method further include an embedding component configured to embed the semantic information and the geometric information to obtain a combined embedding. In some aspects, the embedding component is further configured to generate an adjacency matrix.

FIG. 1 shows an example of an image processing system according to aspects of the present disclosure. The example shown includes image processing apparatus 100, database 105, network 110, and user interface 115.

In one example, a user interacts with user interface 115 to upload or point to a vector graphics image as a query to find similar vector graphics images. Image processing apparatus 100 receives the query over network 110 and extracts both semantic and geometric information from the vector graphics query. Image processing apparatus 100 then encodes the information into a vector graphics representation. Then, image processing apparatus 100 searches database 105 for other encodings similar to the vector graphics representation. In some embodiments, image processing apparatus 100 compares encodings using, for example, a cosine similarity comparison. Image processing apparatus 100 then retrieves similar encodings and decodes them to reconstruct response images, and provides the response images to the user via user interface 115.

According to some aspects, image processing apparatus 100 obtains semantic information and geometric information for a vector graphics image, where the semantic information describes individual segments of the vector graphics image, and the geometric information describes geometric relationships among the individual segments. In some aspects, the command classifications in both the semantic information and the decoded semantic information belong to a set of command types, and where the set of command types includes a "Move" command, a "Line" command, and a "Curve" command.

Embodiments of image processing apparatus 100 are implemented on one or more servers. A server provides one or more functions to users linked by way of one or more of the various networks 110. In some cases, the server includes a single microprocessor board, which includes a microprocessor responsible for controlling all aspects of the server. In some cases, a server uses microprocessor and protocols to exchange data with other devices/users on one or more of the networks 110 via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus. Image processing apparatus 100 is an example of, or includes aspects of, the apparatus described with reference to FIG. 2.

Various data used and processed by image processing apparatus 100, such as vector graphics files and embeddings, are stored in database 105. In some cases, database 105 includes data storage, as well as a server to manage disbursement of data and content. A database is an organized collection of data. For example, a database stores data in a specified format known as a schema. A database may be structured as a single database, a distributed database, multiple distributed databases, or an emergency backup database. In some cases, a database controller may manage data storage and processing in database 105. In some cases, a user interacts with the database controller. In other cases, the database controller may operate automatically without user interaction.

Network 110 facilitates the transfer of information between image processing apparatus 100, database 105, and user interface 115 (e.g., to a user). Network 110 can be referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

User interface 115 is configured to receive commands from and present content to a user. For example, a user may specify one or more vector graphics files to be encoded via user interface 115. Embodiments of user interface 115 include a display, input means such as a mouse and keyboard or touch screen, speakers, and the like. According to some aspects, user interface 115 provides a reconstructed image based on the vector graphics representation generated by image processing apparatus 100.

Figure 2:
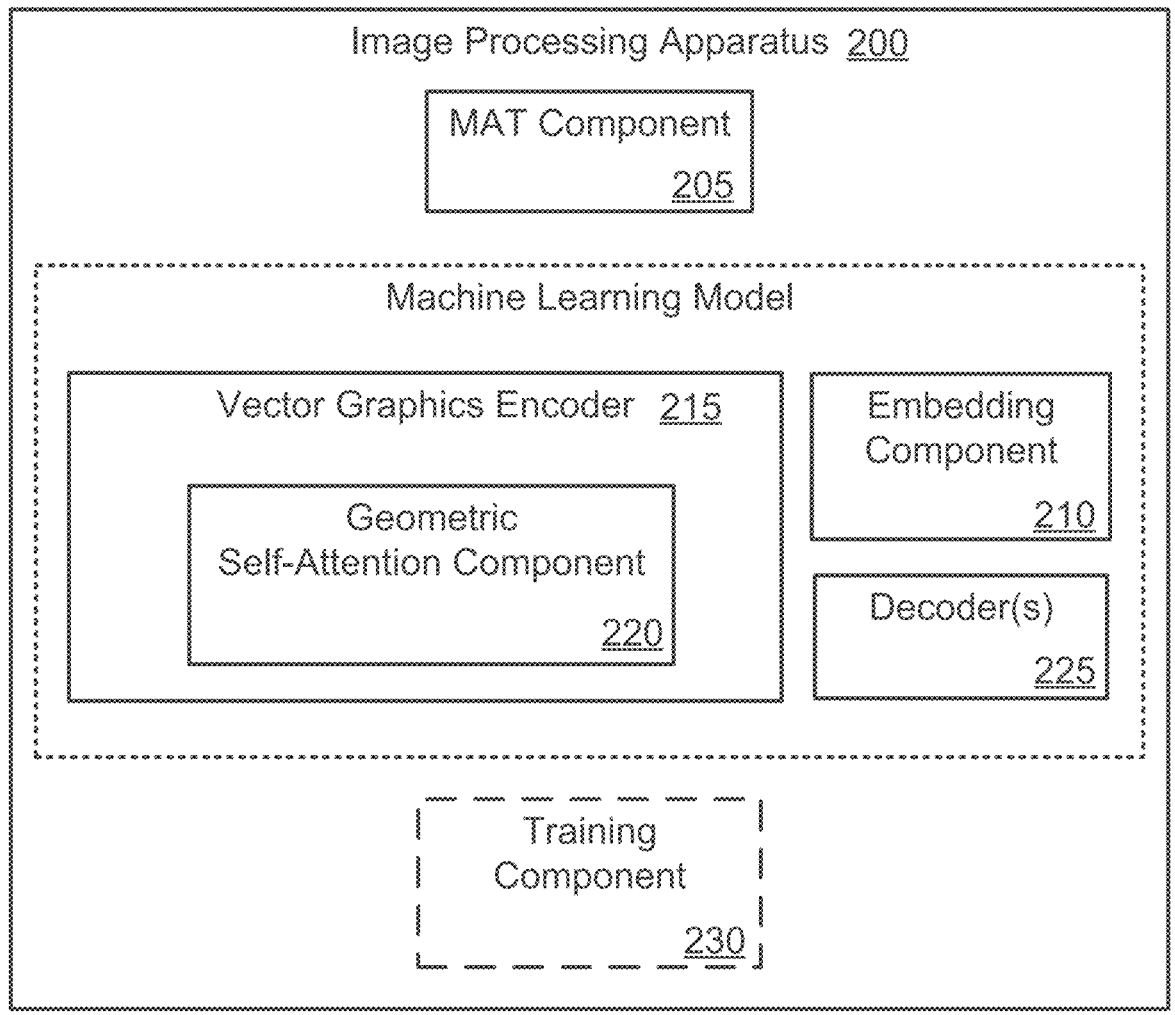
FIG. 2 shows an example of an image processing apparatus according to aspects of the present disclosure.

FIG. 2 shows an example of an image processing apparatus 200 according to aspects of the present disclosure. The example shown includes image processing apparatus 200, MAT component 205, embedding component 210, vector graphics encoder 215, geometric self-attention component 220, decoder(s) 225, and training component 230. Image processing apparatus 200 is an example of, or includes aspects of, the corresponding image processing apparatus described with reference to FIG. 1.

Embodiments of image processing apparatus 200 include several components. The term 'component' is used to partition the functionality enabled by the processor(s) and the executable instructions included in the computing device used to implement image processing apparatus 200 (such as the computing device described with reference to FIG. 11). The partitions may be implemented physically, such as through the use of separate circuits or processors for each component, or may be implemented logically via the architecture of the code executable by the processors.

According to some aspects, MAT component 205 performs a medial axis transform (MAT) on semantic information of a vector graphics file to obtain geometric information about shapes within the file. MAT component 205 is an example of, or includes aspects of, the corresponding element described with reference to FIG. 4, and additional detail regarding the MAT operation will be provided with reference to FIG. 4.

According to some aspects, embedding component 210 embeds the semantic information and the geometric information to obtain a combined embedding, where the vector graphics representation is based on the combined embedding. In some examples, embedding component 210 generates an adjacency matrix based on the geometric information, where the geometric self-attention is based on the adjacency matrix. Some embodiments of embedding component 210 embed the semantic information and the geometric information in the same form as they are input, and some embodiments perform additional processing on the information, for example, transforming the information into a format or dimensionality that is compatible with the rest of the machine learning model. Additional detail regarding such transformations will be provided with reference to FIG. 3. Embedding component 210 is an example of, or includes aspects of, the corresponding element described with reference to FIG. 3.

According to some aspects, vector graphics encoder 215 encodes the semantic information and the geometric information to obtain a vector graphics representation for the vector graphics image. Vector graphics encoder 215 includes trainable parameters that embed and emphasize salient pieces of information from the semantic information and the geometric information in the representation. Vector graphics encoder 215 is an example of, or includes aspects of, the corresponding element described with reference to FIGS. 3 and 9.

In one aspect, vector graphics encoder 215 includes geometric self-attention component 220. Geometric self-attention component 220 is configured to perform geometric self-attention on a combined embedding generated from embedding component 210. In some examples, geometric self-attention component 220 generates a graph based on the semantic information and the adjacency matrix. In some examples, geometric self-attention component 220 applies a graph convolution network (GCN) to the graph, where the geometric self-attention is based on the GCN. Additional detail regarding this process is provided with reference to FIG. 5. Geometric self-attention component 220 is an example of, or includes aspects of, the corresponding element described with reference to FIG. 3.

According to some aspects, training component 230 compares the semantic information from an original vector graphics file and decoded semantic information generated by decoder(s) 225 during a training process. In some examples, training component 230 updates parameters of the machine learning model based on the comparison.

In some examples, training component 230 generates a reconstruction loss based on the comparison, where the reconstruction loss measures a difference between original commands included in the semantic information and reconstructed commands included in the decoded semantic information. In some examples, training component 230 updates parameters of the machine learning model based on the reconstruction loss. In some examples, training component 230 generates a classification loss based on the comparison, where the classification loss measures a difference between command classifications included in the semantic information and reconstructed command classifications included in the decoded semantic information. In some examples, training component 230 updates parameters of the machine learning model based on the classification loss.

Training component 230 is an example of, or includes aspects of, the corresponding element described with reference to FIG. 9. In at least one embodiment, training component 230 is provided on an apparatus different from image processing apparatus 200.

Figure 3:
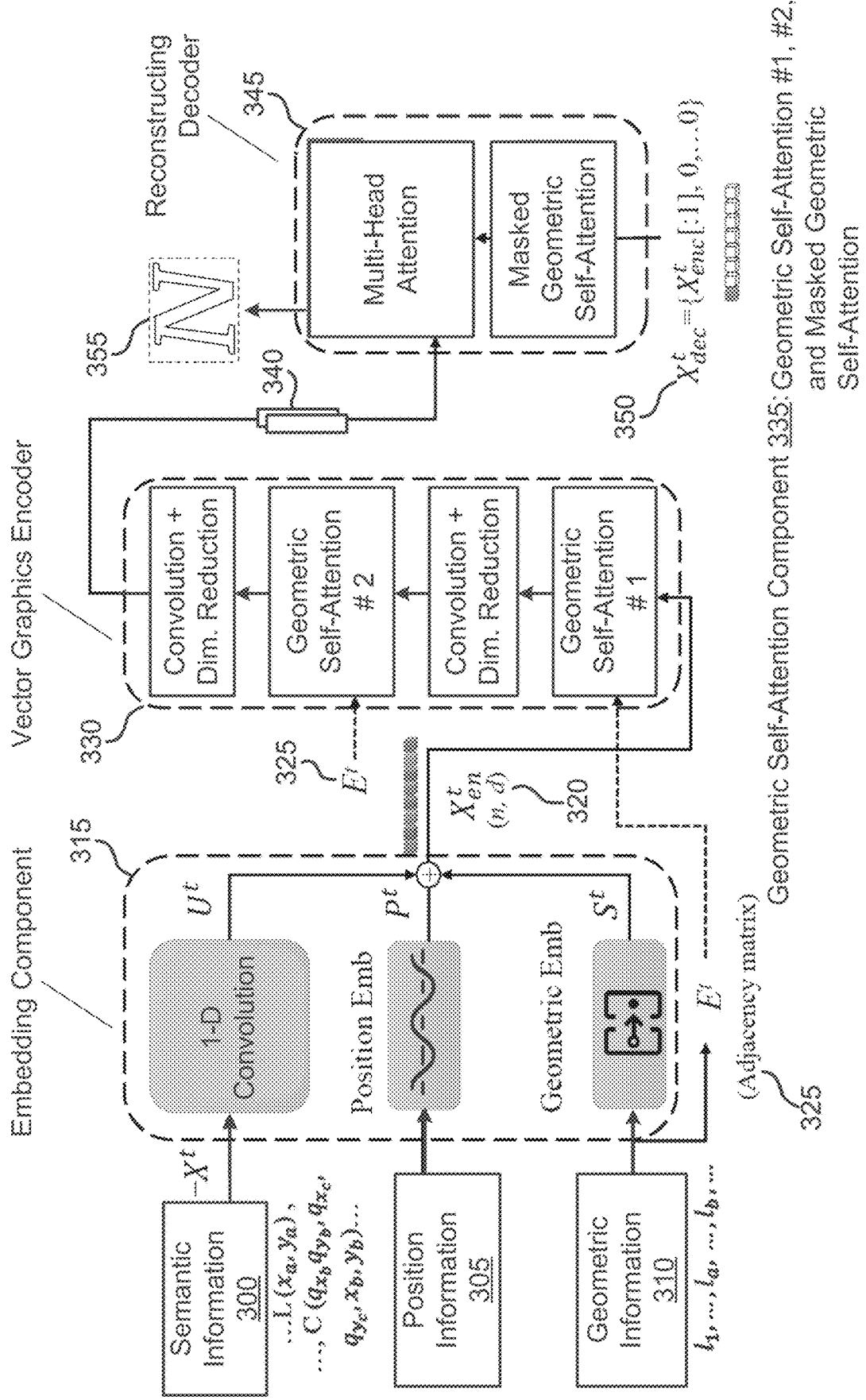
FIG. 3 shows an example of a machine learning model according to aspects of the present disclosure.

FIG. 3 shows an example of a vector graphics representation generation pipeline according to aspects of the present disclosure. The example shown includes semantic information 300, position information 305, geometric information 310, embedding component 315, combined embedding 320, adjacency matrix 325, vector graphics encoder 330, geometric self-attention component 335, attention-weighted combined embedding 340, reconstructing decoder 345, masked input 350, and reconstructed image 355.

In the example shown, embedding component 315 generates combined embedding 320 from semantic information 300, position information 305, and geometric information 310 of a vector graphics image. In some embodiments, embedding component 315 applies additional processing to one or more of the information streams before embedding them. Then, combined embedding 320 is input to vector graphics encoder 330, along with adjacency matrix 325. Vector graphics encoder 330 performs geometric self-attention component on the embedding using geometric self-attention component 335, which will be described in further detail with reference to FIG. 5. This generates attention-weighted combined embedding 340, which is a learned representation for the vector graphics image. Finally, reconstructing decoder decodes attention-weighted combined embedding 340 using masked input 350 as a basis to generate reconstructed image 355.

Semantic information 300 includes "raw" commands from an original graphics file such as an SVG file. The raw t-th SVG's arguments contain the type and corresponding coordinates of the commands, where the coordinates with continuous values are first constructed into a tensor format, $X^t \in \mathbb{R}^{n \times 8}$ and n is the number of commands. In an example, a command includes a "Move" command, a "Line" command, or a "Curve" command. The "Move" command points to the start of a new path in the image and includes one point argument to indicate the path start point. The "Line" command includes two point arguments to define a line. The "Curve" command includes a point argument as a destination point from the last point, as well as multiple control points that define the curve of the line. Most vector graphics commands have 8 or fewer arguments. Accordingly, each row of the tensor $X^t$ includes 8 values to capture each command, though embodiments are not necessarily limited thereto. For example, some embodiments may include more than 8 values per row to accommodate extensive lengths in the commands. Additional detail regarding semantic information 300 will be provided with reference to FIG. 4.

Position information 305 measures the similarity between the raw commands from a vector graphics file. It includes a list of values for each command that are measurements of the current command's similarity to every other command in the vector graphics file. Additional detail regarding position information 305 will be described further on.

Geometric information 310 is generated by performing a MAT operation on the raw commands from a vector graphics file. Geometric information 310 includes a list of segments, where the segments include the original information from the raw commands, but are organized around a medial axis of a shape within the vector graphics image. In some cases, geometric information 310 utilizes the original raw commands, arranged in a geometrically significant way based on the new segments. For example, a MAT component may map the new segments generated by the MAT operation back into a list of original commands and labels by picking the set of commands and labels that correspond to each new segment. This way, embedding component 315 and encoder 330 do not need to handle a different form of data through the list of new segments. Additional detail regarding geometric information 310 will be provided with reference to FIG. 4.

Embedding component 315 is configured to combine semantic information 300, position information 305, and geometric information 310 into combined embedding 320. In some embodiments, embedding component 315 performs transformation operations on the input information streams. In one example, embedding component 315 performs a 1D convolution operation on semantic information 300 to map the tensor form $X^t$ to a d-dimensional vector $U^t$. Additional processing may be applied to geometric information 310 to generate a geometric embedding S. Detail regarding processing of geometric information 310 will be provided with reference to FIG. 4. Embedding component 315 is an example of, or includes aspects of, the corresponding element described with reference to FIG. 2.

Combined embedding 320 includes data from semantic information 300, position information 305, and geometric information 310. It is a preliminary representation of a vector graphics image before geometric self-attention and dimensionality reduction. Combined embedding 320 is an example of, or includes aspects of, the corresponding element described with reference to FIGS. 5 and 9.

Adjacency matrix 325 is a data object that includes adjacency information based on the segments generated from the MAT operation. In one example, adjacency matrix 325 indicates the neighboring commands for each command in a vector graphics image. Adjacency matrix 325 provides additional structural information to the image processing apparatus. Adjacency matrix 325 is an example of, or includes aspects of, the corresponding element described with reference to FIG. 5.

Vector graphics encoder 330 is configured to process combined embedding 320 using geometric self-attention component 335 to generate attention-weighted combined embedding 340. Some embodiments of vector graphics encoder 330 include two geometric self-attention modules, as well as two or more convolutional neural network (CNN) layers and two or more dimensionality reduction layers such as MaxPool layers. Additional detail regarding geometric self-attention component 335 will be provided with reference to FIG. 5. Vector graphics encoder 330 is an example of, or includes aspects of, the corresponding element described with reference to FIGS. 2 and 9.

Geometric self-attention component 335 is configured to apply geometric self-attention to combined embedding 320. The geometric self-attention adjusts weights included in combined embedding 320 to yield attention-weighted combined embedding 340. In one example, geometric self-attention component 335 includes two geometric self-attention modules in vector graphics encoder 330 and another geometric self-attention module in reconstructing decoder 345. Additional detail regarding geometric self-attention component 335 will be provided with reference to FIG. 5. Geometric self-attention component 335 is an example of, or includes aspects of, the corresponding element described with reference to FIG. 2.

Attention-weighted combined embedding 340 is the vector graphics representation described above at the beginning of the detailed description, and is generated by an image processing apparatus according to embodiments of the present disclosure. This intermediate representation includes the salient information from an original vector graphics image input in a compact tensor that enables efficient storage and improved performance in downstream tasks. In the presently described embodiment, attention-weighted combined embedding 340 is used by reconstructing decoder 345 to generate reconstructed image 355. Attention-weighted combined embedding 340 is an example of, or includes aspects of, the corresponding element described with reference to FIG. 5.

Reconstructing decoder 345 is configured to decode attention-weighted combined embedding 340 into a series of reconstructed vector graphics commands. In some examples, such as the pipeline illustrated in FIG. 3, reconstructing decoder 345 uses masked input 350 as a basis for reconstruction. According to some aspects, reconstructing decoder 345 decodes a vector graphics representation (i.e., attention-weighted combined embedding 340) to obtain decoded semantic information 300. In some examples, reconstructing decoder 345 generates the reconstructed image 355 based on the decoded semantic information 300.

In some examples, reconstructing decoder 345 decodes the interpolated vector graphics representation to obtain interpolated semantic information, where the reconstructed image 355 is based on the interpolated semantic information 300. Additional detail regarding interpolation will be provided with reference to FIG. 8. Reconstructing decoder 345 is an example of, or includes aspects of, the corresponding element described with reference to FIG. 9.

Masked input 350 is a largely empty data object (e.g., initially including mostly zeros) of the same dimensionality as combined embedding 320. Reconstructing decoder 345 is trained to "un-mask" or predict remaining values in masked input 350 to decode attention-weighted combined embedding 340 and generate commands that are similar to the original input series of vector graphics commands. Then, a renderer can use the commands to render reconstructed image 355 using conventional methods. In some cases, reconstructing decoder 345 includes the renderer.

Reconstructed image 355 is an image that is created by decoding attention-weighted combined embedding 340. In one example, a user selects a small icon or glyph in a user interface indicating the image they wish to render. Then, the image processing apparatus as described herein retrieves the vector representation for that image, decodes it, and generates and renders reconstructed image 355 in a high resolution.

The following description provides the mathematical relationships between the various pieces of information described above, example implementation details such as sizes and dimensionality, and additional processing performed by embedding component 315. The components described above implement a pipeline for representation learning. Representation learning involves training the model—embedding component 315, vector graphics encoder 330, and reconstructing decoder 345—to learn inductive biases from training data to facilitate downstream tasks. Embodiments capture at least two kinds of inductive biases: continuous values and geometric information.

The following describes a use case involving vector graphics commands from an SVG file, but the methods described herein may be applied to any vector graphics file type that includes sequential data. In an example, embodiments set a maximum sequence length $L_x$ for a training dataset that includes multiple SVG images, where SVG is one of many vector graphics file formats. SVG training images that are shorter than the sequence length $L_x$ are padded with arbitrary values such as zeroes. Next, embodiments generate a padding mask that adds a large negative value to the attention fraction of the padded positions before computing the self-attentive distribution with the softmax function. A continuous value embedding layer with 1D convolutional operation projects the t-th SVG input $X^t$ into a d-dimension vector $U^t$:

$$U^t = CNN(X^t) \quad (1)$$

The semantic vector $U^t$ includes the semantic information from the original SVG commands, i.e. original semantic information 300. It should be noted that embedding component 315 which performs the convolution operation can fully utilize the translation equivariance of convolutional operations for SVG input, and as well as maintain rotation invariance and size invariance from SVG data. The model preserves positional information from input SVG commands by using the position embedding layer:

$$P^t(p, 2j) = \sin(m/(2L_x)^{2j/d}), \quad (2)$$
$$P^t(p, 2j+1) = \cos(m/(2L_x)^{2j/d}),$$

where $j \in \{1, \ldots, [d/2]\}$ and $m \in \{0, \ldots, L_x-1\}$. Accordingly, the geometric self-attention downstream can compute the similarity with access to global information and affordable consumption. The position encoding function described with Equation 2 is inductive and parameter-free to handle variable input length. In some cases, the computation described by Equation 2 is performed prior to embedding component 315 to generate position information 305.

In some cases, the image processing apparatus exacts the segment label $l_i^t$ for each input command $p_i^t$ according to the mapping process described with reference to FIG. 4, and uses a geometric embedding layer with a look-up table to get the geometric embedding S which includes geometric information 310. In an example, the embeddings for semantic information 300, position information 305, and geometric information 310 are combined to generate the combined embedding 320, which may be referred to as a "feeding vector". The feeding vector $X_{en}^t \in \mathbb{R}^{L_x \times d}$ can be formulated as:

$$X_{en}^t = \alpha U^t + \beta P^t + \gamma S^t \quad (3)$$

where $\alpha$, $\beta$, $\gamma$ are factors used to balance the magnitude between the scalar projection and position/geometric embeddings.

Figure 4:
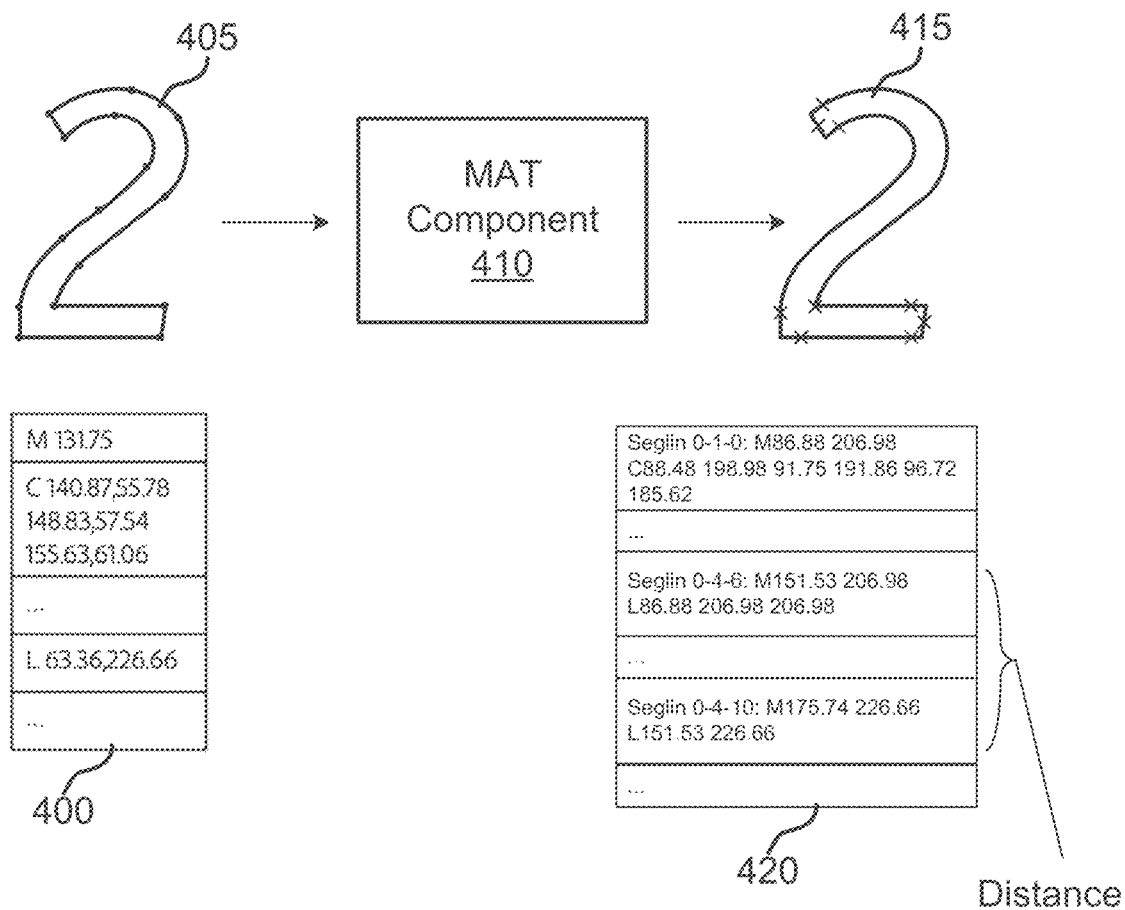
FIG. 4 shows an example of a medial axis transform (MAT) operation according to aspects of the present disclosure.

FIG. 4 shows an example of a MAT operation according to aspects of the present disclosure. The example shown includes semantic information 400, image rendered using original SVG commands 405, MAT component 410, image rendered using new segment commands 415, and geometric information 420.

Semantic information 400 includes raw commands from an original graphics file such as an SVG file. The raw t-th SVG's arguments contain the type and corresponding coordinates of the commands, where the coordinates with continuous values are first constructed into a tensor format, $X^t \in \mathbb{R}^{n \times 8}$ and n is the number of commands. In an example, a command includes a "Move" command, a "Line" command, or a "Curve" command. These raw commands are used (e.g., by conventional rendering methods) to produce rendered images 405. In the example shown, semantic information 400 produces the '2' shape illustrated by the image rendered using original SVG commands 405 through a series of line and curve commands. The ends and the vertices of each line are represented by dots throughout the image. The list of commands shown includes a list of commands from an SVG file, which is a type of vector graphics file. Semantic information 400 is an example of, or includes aspects of, the corresponding element described with reference to FIG. 3.

A basic attention mechanism might determine relationships between the shapes in the vector using only semantic information 400, e.g., the "move" M, "line" L, and "curve" C commands illustrated on the left. Embodiments of the present invention add geometric self-attention that is configured to encode geometric relationships. Embodiments extract explicit geometric information from semantic information 400 by performing a medial axis transform (MAT) operation on semantic information 400 using, for example, MAT component 410. MAT component 410 is an example of, or includes aspects of, the corresponding element described with reference to FIG. 2.

For example, a raw vector graphics input can be given as $\{p_0, p_1, p_2, \ldots, p_n\}$, where $p_i$ denotes the i-th command in a vector graphics file, and n is the number of original commands. Embodiments obtain labeling of segments by applying the MAT operation on the raw input. The MAT operation leverages the medial axis and outline information to generate new segments labeled based on different geometric relationships: geometric information 420 as $\{(\hat{p}_1, \hat{l}_1), (\hat{p}_2, \hat{l}_2), \ldots, (\hat{p}_m, \hat{l}_m)\}$, where $\hat{l}_i$ is the label of the new command $p_i$. Image rendered using new segment commands 415 appears the same as image rendered using original SVG commands 405, however image rendered using new segment commands 415 consists of new line segments that are based on the MAT operation.

In some examples, commands with the same label have a strong position relationship inside the given vector graphics image. In some cases, MAT can split an original command into several segments (i.e., new commands), such that m≥n. In some cases, having additional commands in a different form than the original commands can cause reduced performance of the machine learning model—the embedding component, the vector graphics encoder, and the decoder. Accordingly, embodiments map the new segments and labels back to the original input, generating a list of original commands that are ordered in a way that preserves the geometric relationships found by MAT. For example, the model groups different commands by start and end points such that $p_i = \{p_k, \ldots, p_j\}$. The longest label is computed based on the distance between the start and end point of the label set $\{\hat{l}k, \ldots, \hat{l}_j\}$ to obtain the final label $l_i$ for $p_i$. In some cases, the geometric information 415 used to train the model is $\{(p_1, l_1), (p_2, l_2), \ldots, (p_n, l_n)\}$.

In at least one embodiment, a geometric embedding layer within an embedding component is used to extract a geometric embedding S from geometric information 415 $\{(p_1, l_1), (p_2, l_2), \ldots, (p_n, l_n)\}$ using a lookup table. The geometric embedding S may include the distance information between each segment as illustrated in FIG. 4.

Figure 5:
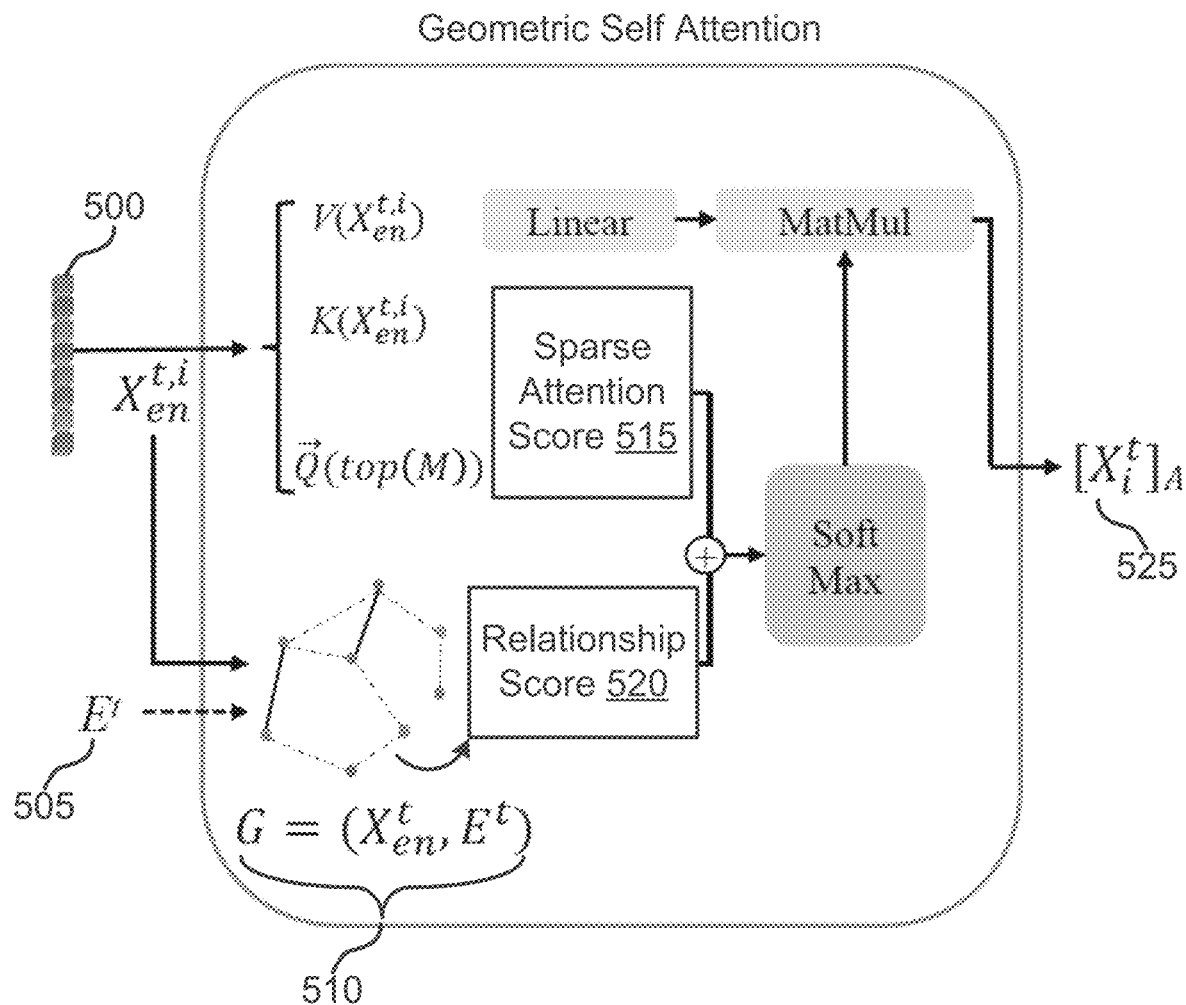
FIG. 5 shows an example of a geometric self-attention component according to aspects of the present disclosure.

FIG. 5 shows an example of a geometric self-attention component according to aspects of the present disclosure. The example shown includes combined embedding 500, adjacency matrix 505, graph neural network 510, sparse attention score 515, relationship score 520, and attention-weighted combined embedding 525.

Combined embedding 500 is an example of, or includes aspects of, the corresponding element described with reference to FIGS. 3 and 9. Adjacency matrix 505 is an example of, or includes aspects of, the corresponding element described with reference to FIG. 3. Attention-weighted combined embedding 525 is an example of, or includes aspects of, the corresponding element described with reference to FIG. 3.

As described above, a basic attention mechanism encodes similarities between semantic information from raw vector graphics commands, but does not capture the geometric relationships among the shapes in the vector graphics image. Accordingly, embodiments prepare a new list of segments from the raw commands by performing a MAT operation. As described with reference to FIG. 3, both the semantic information from the raw commands and the geometric information from the MAT processed commands are embedded into a combined embedding such as combined embedding 500 which is then input to a geometric self-attention component along with adjacency matrix 505. This component captures the geometric relationships jointly with the semantic information.

In some examples, multiple geometric self-attention modules are stacked which jointly deal with long-term sequential dependency and geometric dependency in the attention mechanism. The following will describe the computations used to apply geometric self-attention to combined embedding 500. Embodiments utilize features from combined embedding 500 via an efficient attention mechanism to capture precise long-term dependency. The canonical self-attention is defined based on the scaled dot-product of the input tuple, i.e., query $q \in \mathbb{R}^d$, key $K \in R^{L_K \times d}$, and value $V \in \mathbb{R}^{L_V \times d}$. For example, the i-th query's attention is defined as a kernel smoother in a probability form:

$$\mathcal{A}(q_i, K, V) = \sum_j \frac{k(q_i, k_j)}{\sum_l (q_i, k_l)} v_j = \mathbb{E}_{p(k_j|q_i)}[v_j] \quad (4)$$

where $p(k_j|q_i)=k(q_i, k_j)/\Sigma_l(q_i, k_j)$ and $k(q_i, k_j)$ selects the asymmetric exponential kernel $\exp(q_i, k_j^T/\sqrt{d})$. The model calculates the importance of queries by Kullback-Leibler divergence:

$$M(q_i, K) = \max_j \left\{ \frac{q_i, k_j^T}{\sqrt{d}} \right\} - \frac{1}{L_K} \sum_{j=1}^{L_K} \frac{q_i, k_j^T}{\sqrt{d}} \quad (5)$$

where M ($q_i$, K) is the i-th query's sparsity score, e.g. sparse attention score 515. A high value of M($q_i$, K) indicates a high chance to activate the dominate dot-product pairs in the self-attention. A query Q, containing top u queries with query sparsity score given by M, calculates sparse attention score 515 as:

$$A_{att} = \bar{Q}K^T/\sqrt{d} \quad (6)$$

In some cases, information loss can be avoided by generating different sparse query-key pairs according to different attention heads and sparse attention score 515 can capture the relationships between input commands from a data-driven aspect.

Segments with the same label share a strong relationship even if such segments are at a long distance in the input sequence. In some cases, the distance in the input sequence is not reflected in a standard self-attention module which considers the semantic characteristics. Commands can be represented as nodes in a non-Euclidean space and linked by edges with the geometric information such as adjacency and same segment label. This information is included in adjacency matrix 505. An embodiment of the present disclosure includes a graph convolution network (GCN) such as graph neural network 510 to extract the structural relationship between different commands. In some examples, the image processing apparatus uses geometric labels included in combined embedding 500 to build the weight matrix E, where the commands adjacent to each other or sharing the same label have an edge in the weight matrix E. If two commands are not adjacent to each other nor share the same label, there is no edge between them in the weight matrix E.

The weight matrix E includes structure information of the vector graphics file, and commands sharing the same labels can distinguish local details based on their individual features. Graph neural network 510 extracts the structural information from weight matrix E, i.e., adjacency matrix 505. In some cases, a graph $\mathcal{G}=(V, E)$ is used to learn a function of SVG commands, where V is the set of nodes' features of each single SVG, i.e., $X_{en}^t$ at the first layer, and E is the adjacency matrix. The SVGformer model can produce command-level output $A_{geo} \in \mathbb{R}^{N \times d}$ with L multiple layers GCN, where l-th layer output $H^l$ can be used to represent the latent vectors to get the final output:

$$H^{l+1} = f(H^l, E) = \sigma(EH^l W^l) \qquad (7)$$

where $H^0$ is the input features of the GCN, i.e., $X_{en}$ at the very first layer, f is the graph convolutional function with learnable matrix W and o is the non-linear activation function for GCN and $H^L = A_{geo}$. $H^{l+1}$ encodes relationship score 520, which quantifies the adjacency relationships between nodes in the graph (original commands from an SVG file).

Both sparse attention score 515 and relationship score 520 are used to apply geometric self-attention. The geometric self-attention module illustrated in FIG. 5 estimates correlations from both semantic features from the original SVG commands and from geometric dependencies. In some embodiments, relationship score 520 is injected into sparse attention score 515. The attention mechanism with the modified attention score can be represented as:

$$\mathcal{A}(Q, K, V) = \text{Softmax}(A_{att} + A_{geo})V \qquad (8)$$

Equation 8 represents the final step of generating attention-weighted combined embedding 525, which includes geometric self-attention adjusted values. Some embodiments additionally apply a 1D convolutional operation following an exponential linear unit (ELU) activation function and a max pooling operation on the output of the attention layer:

$$X_{j+1} = \text{Max}Pool\left(ELU\left(Conv1d\left([X_j]_{\mathcal{A}_j}\right)\right)\right) \qquad (9)$$

where $[\cdot]_{\mathcal{A}}$ represents the j-th geometric self-attention module. Accordingly, the model can handle the permutation invariance where the order of shapes in an SVG image is arbitrary. The final representation of the encoder is the last layer's output from the vector graphics encoder, and can be used for multiple downstream tasks.

Applications of Vector Graphics Representations

A method for encoding vector graphics images is described. One or more aspects of the method include obtaining semantic information and geometric information for a vector graphics image, wherein the semantic information describes individual segments of the vector graphics image, and the geometric information describes geometric relationships among the individual segments; encoding the semantic information and the geometric information to obtain a vector graphics representation for the vector graphics image; and providing a reconstructed image based on the vector graphics representation.

Some examples of the method, apparatus, non-transitory computer readable medium, and system further include embedding the semantic information and the geometric information to obtain a combined embedding, wherein the vector graphics representation is based on the combined embedding. Some examples further include performing a medial axis transform (MAT) on the semantic information to obtain the geometric information. Some examples further include performing geometric self-attention based on the semantic information and the geometric information to obtain the vector graphics representation.

Some examples of the method, apparatus, non-transitory computer readable medium, and system further include generating an adjacency matrix based on the geometric information, wherein the geometric self-attention is based on the adjacency matrix. Some embodiments of the method further include generating a graph based on the semantic information and the adjacency matrix. In some cases, the geometric self-attention component applies a graph convolution network (GCN) to the graph, wherein the geometric self-attention is based on the GCN.

Some examples of the method, apparatus, non-transitory computer readable medium, and system further include decoding the vector graphics representation to obtain decoded semantic information. Some examples further include generating the reconstructed image based on the decoded semantic information. Some examples further include classifying the vector graphics image based on the vector graphics representation to obtain an image type, wherein the reconstructed image is provided based on the image type.

Some embodiments are configured to perform tasks such as search and interpolation using the vector graphics representations. For example, some examples of the method further include generating an additional vector graphics representation based on an additional vector graphics image. Some examples further include interpolating between the vector graphics representation and the additional vector graphics representation to obtain an interpolated vector graphics representation. Some examples further include decoding the interpolated vector graphics representation to obtain interpolated semantic information, wherein the reconstructed image is based on the interpolated semantic information.

Some examples of the method, apparatus, non-transitory computer readable medium, and system further include obtaining a query vector graphics image. Some examples further include encoding semantic information and geometric information from the query vector graphics image to obtain a query vector graphics representation. Some examples further include comparing the vector graphics representation and the query vector graphics representation. Some examples further include providing the reconstructed image based on the comparison.

Figure 6:
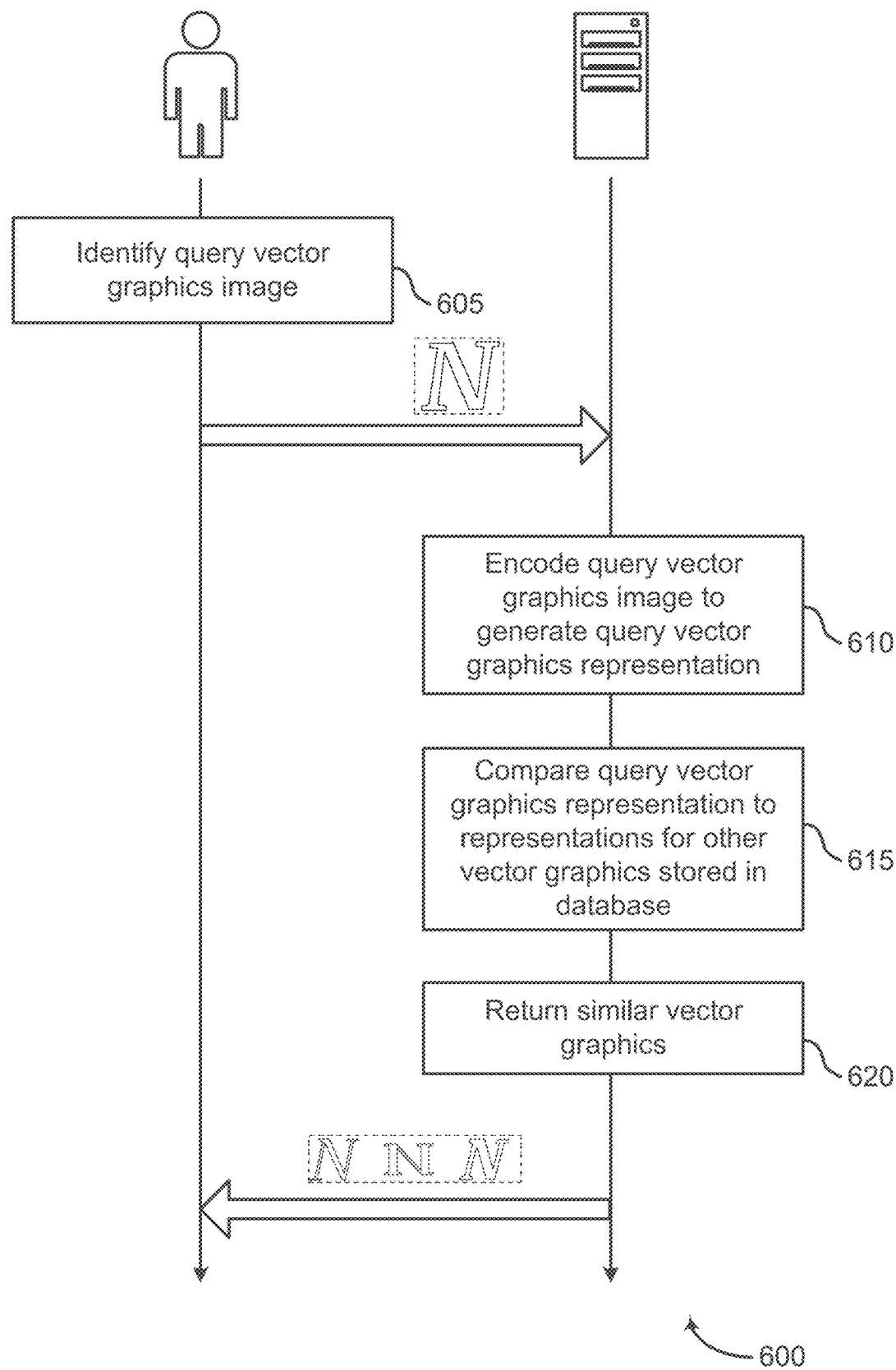
FIG. 6 shows an example of a method for retrieving vector graphics similar to a query according to aspects of the present disclosure.

FIG. 6 shows an example of a method 600 for retrieving vector graphics similar to a query according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, a user identifies query vector graphics image. The user may identify or upload the query vector graphics image via a user interface as described with reference to FIG. 1.

At operation 610, the system encodes query vector graphics image to generate query vector graphics representation. For example, the system may extract semantic and geometric information from the query vector graphics image, embed the information, and generate an attention-weighted combined embedding as described with reference to FIGS. 3-5.

At operation 615, the system compares query vector graphics representation to representations for other vector graphics stored in database. In some examples, the system performs cosine similarity between the query vector graphics representation and the representations for the other vector graphics, and selects similar vector graphics based on the comparison.

At operation 620, the system returns similar vector graphics. The system may, for example, display the similar vector graphics to the user. The user may then use the similar vector graphics in an illustrator program, or apply them to a design.

Figure 7:
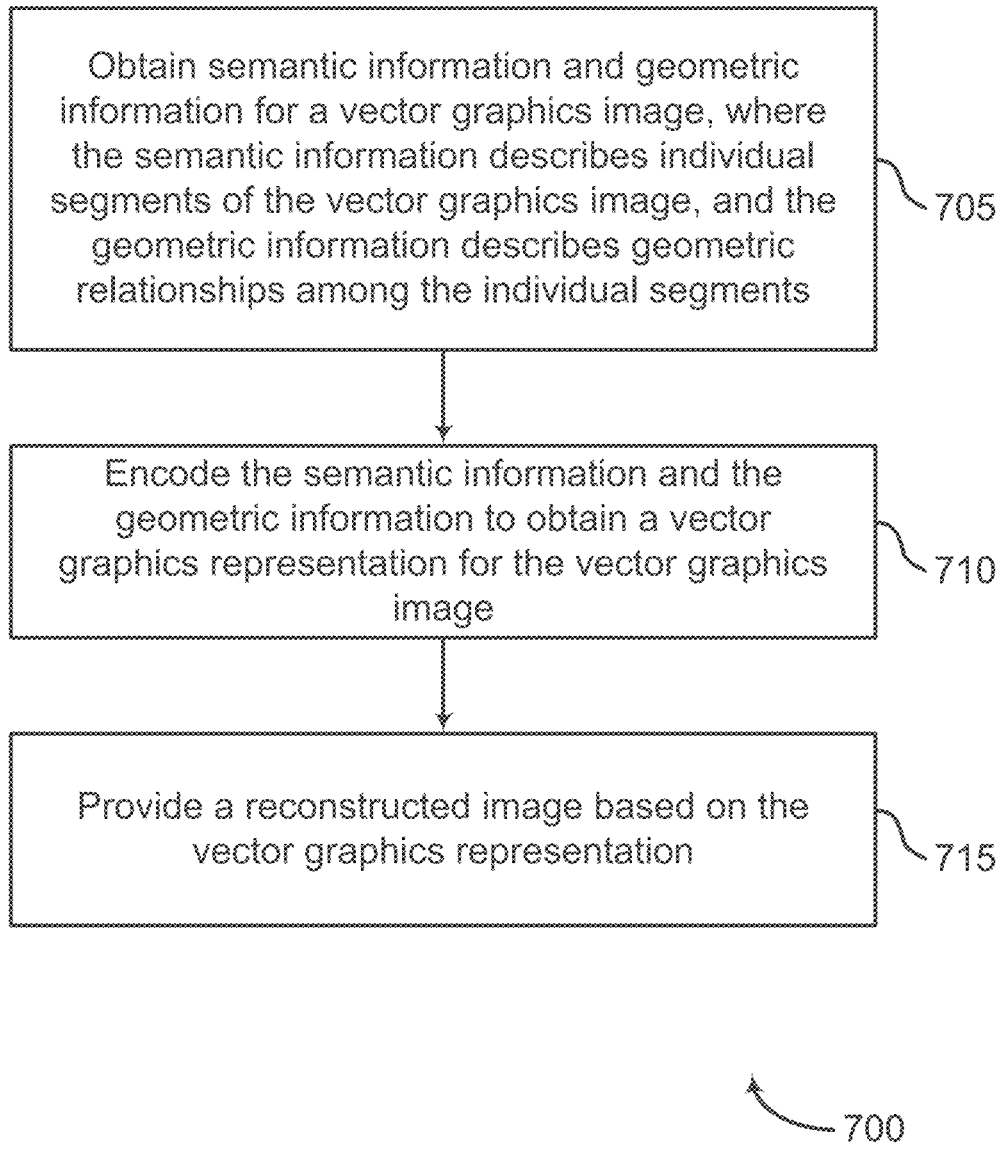
FIG. 7 shows an example of a method for encoding and reconstructing vector graphics according to aspects of the present disclosure.

FIG. 7 shows an example of a method 700 for encoding and reconstructing vector graphics according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system obtains semantic information and geometric information for a vector graphics image, where the semantic information describes individual segments of the vector graphics image, and the geometric information describes geometric relationships among the individual segments. In some cases, the operations of this step refer to, or may be performed by, an image processing apparatus as described with reference to FIGS. 1 and 2. Additional detail regarding the semantic information and the geometric information is provided with reference to FIG. 4.

At operation 710, the system encodes the semantic information and the geometric information to obtain a vector graphics representation for the vector graphics image. In some cases, the operations of this step refer to, or may be performed by, a vector graphics encoder as described with reference to FIGS. 2, 3, and 9. The system may encode both information portions according to the pipeline described with reference to FIG. 3.

At operation 715, the system provides a reconstructed image based on the vector graphics representation. In some cases, the operations of this step refer to, or may be performed by, a user interface as described with reference to FIG. 1. The system may, for example, display the reconstructed to a user via the user interface.

Though only image reconstruction has been described thus far, there are many downstream tasks that are suited to use vector graphics representations. Examples of these tasks include search, classification, and interpolation between vectors.

Figure 8:
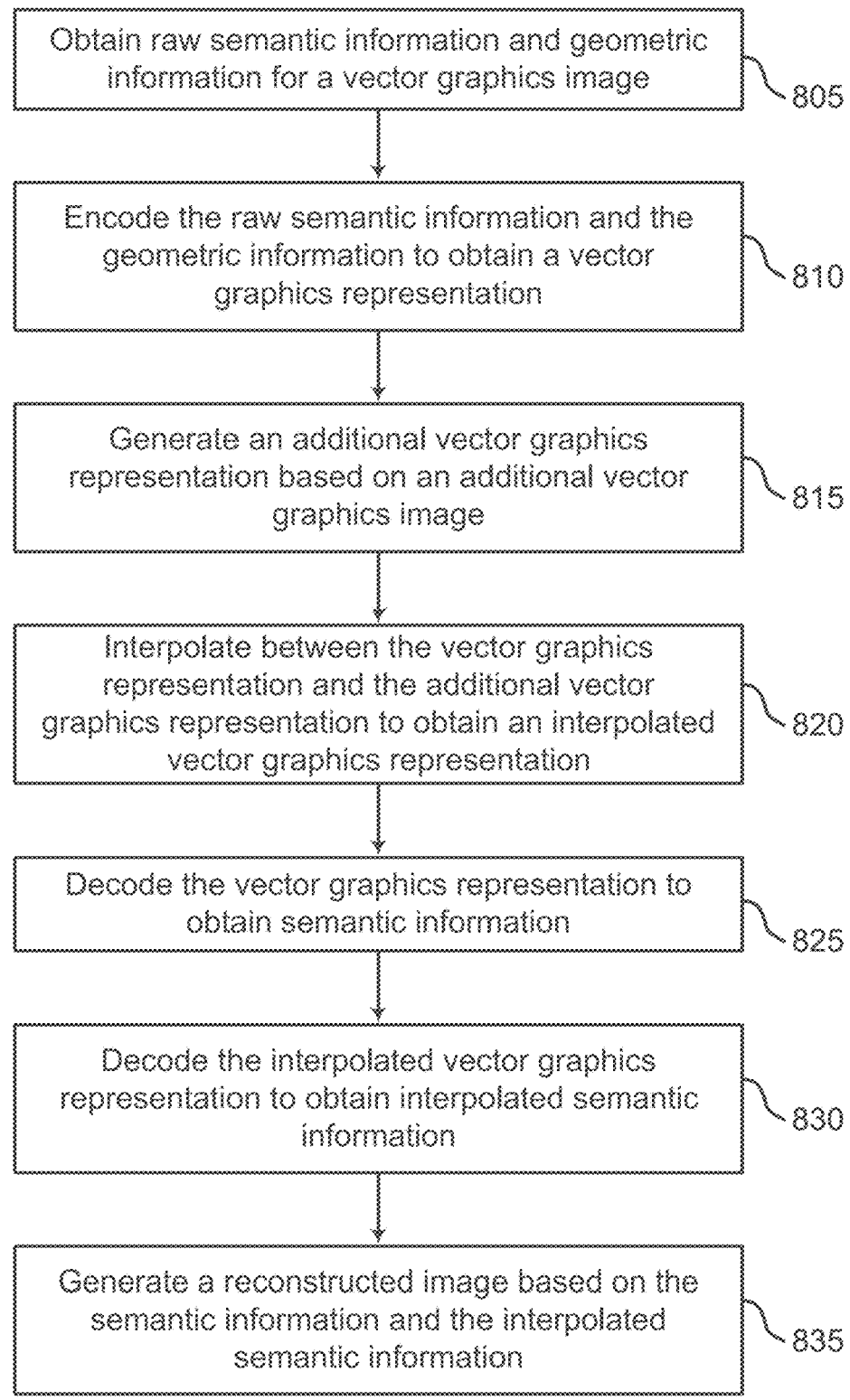
FIG. 8 shows an example of a method for interpolating between two vector graphics according to aspects of the present disclosure.

FIG. 8 shows an example of a method 800 for interpolating between two vector graphics according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The example shown describes an interpolation downstream task for a vector graphics representation. The interpolation involves generating one or more intermediate vector graphics that include features from a starting vector graphics image and a target vector graphics image. For example, the starting vector graphics image may be the thin 'f' glyph shown at the bottom of the figure, and the target vector graphics image is the thick 'f' glyph.

At operation 805, the system obtains raw semantic information and geometric information for a vector graphics image. In some cases, the operations of this step refer to, or may be performed by, an image processing apparatus as described with reference to FIGS. 1 and 2. Additional detail regarding the semantic information and the geometric information is provided with reference to FIG. 4.

At operation 810, the system encodes the raw semantic information and the geometric information to obtain a vector graphics representation. In some cases, the operations of this step refer to, or may be performed by, a vector graphics encoder as described with reference to FIGS. 2, 3, and 9. The system may encode both information portions according to the pipeline described with reference to FIG. 3 to generate a vector graphics representation of a starting vector graphics image.

At operation 815, the system generates an additional vector graphics representation based on an additional vector graphics image. For example, the system may use the process as described with reference to FIG. 3. to generate a vector graphics representation of a target vector graphics image.

At operation 820, the system interpolates between the vector graphics representation and the additional vector graphics representation to obtain an interpolated vector graphics representation. In some cases, the operations of this step refer to, or may be performed by, a vector graphics encoder as described with reference to FIGS. 2, 3, and 9. In an example, the system adjusts values of the vector graphics representation to be closer to the values of the additional vector graphics representation, e.g., it moves the starting vector graphics representation in a vector direction towards the target vector graphics representation to obtain the interpolated vector graphics representation.

At operation 825, the system decodes the vector graphics representation to obtain semantic information. In some cases, the operations of this step refer to, or may be performed by, a reconstructing decoder as described with reference to FIGS. 3 and 9. The semantic information may include a list of vector graphics commands, such as SVG commands. The list of vector graphics commands may be used by conventional vector rendering methods to reconstruct an image.

At operation 830, the system decodes the interpolated vector graphics representation to obtain interpolated semantic information. In some cases, the operations of this step refer to, or may be performed by, a reconstructing decoder as described with reference to FIGS. 3 and 9.

At operation 835, the system generates a reconstructed image based on the semantic information and the interpolated semantic information. For example, the system may generate a reconstructed image using a combination of both the semantic information and the interpolated semantic information. In at least one embodiment, the system generates the reconstructed image based on one set of decoded information.

Training

A method for encoding vector graphics images is described. One or more aspects of the method include obtaining semantic information and geometric information for a vector graphics image, wherein the semantic information describes individual segments of the vector graphics image, and the geometric information describes geometric relationships among the individual segments; encoding, using a machine learning model, the semantic information and the geometric information to obtain a vector graphics representation for the vector graphics image; decoding, using the machine learning model, the vector graphics representation to obtain decoded semantic information; comparing the semantic information and the decoded semantic information; and updating parameters of the machine learning model based on the comparison.

Some examples of the method, apparatus, non-transitory computer readable medium, and system further include generating a reconstruction loss based on the comparison, where the reconstruction loss measures a difference between original commands included in the semantic information and reconstructed commands included in the decoded semantic information. Some examples further include updating parameters of the machine learning model based on the reconstruction loss.

Some examples of the method, apparatus, non-transitory computer readable medium, and system further include generating a classification loss based on the comparison, where the classification loss measures a difference between command classifications included in the semantic information and reconstructed command classifications included in the decoded semantic information. Some examples further include updating parameters of the machine learning model based on the classification loss. In some aspects, the command classifications in both the semantic information and the decoded semantic information belong to a set of command types, and wherein the set of command types includes a "Move" command, a "Line" command, and a "Curve" command.

Figure 9:
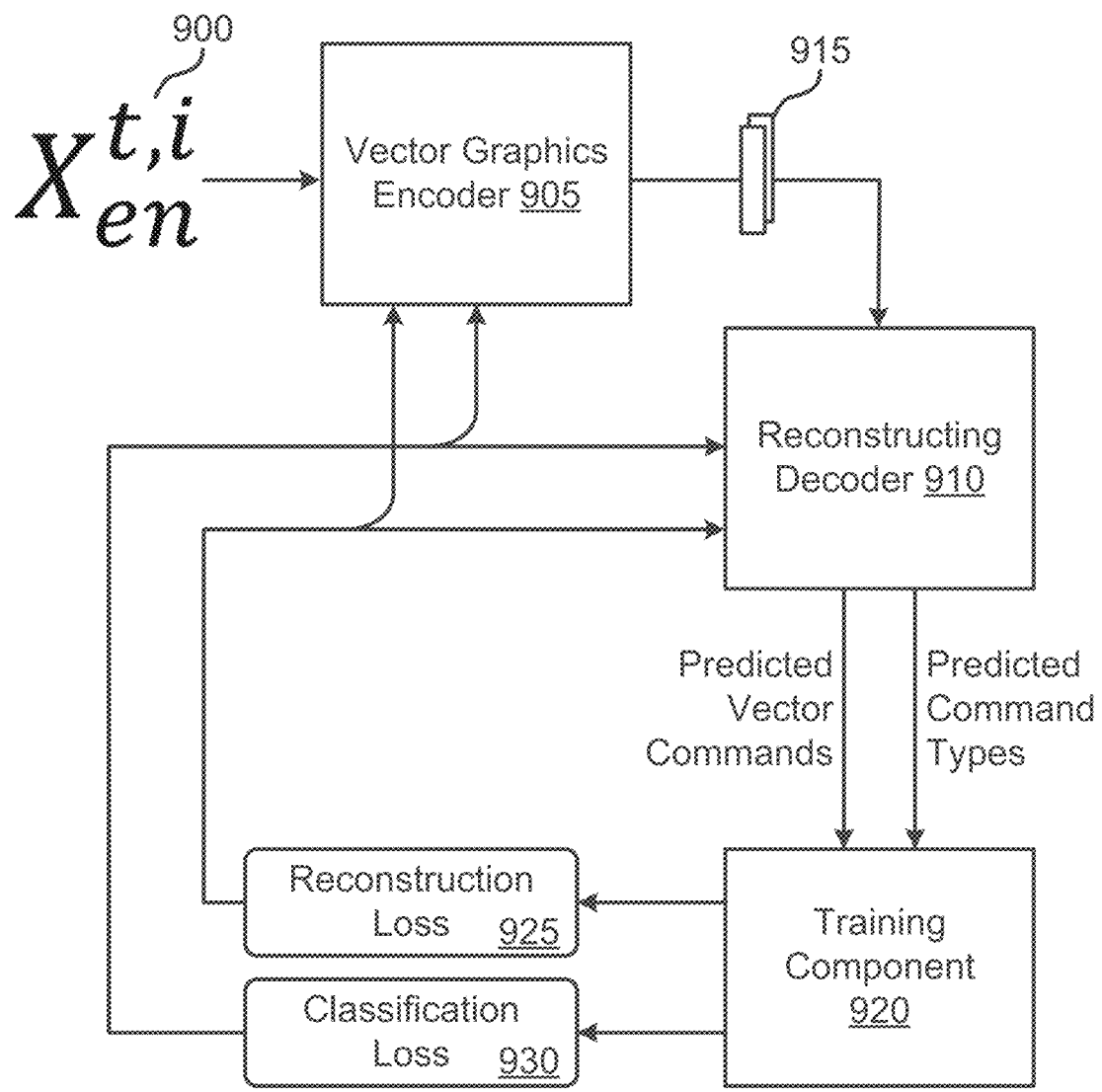
FIG. 9 shows an example of a training pipeline according to aspects of the present disclosure.

FIG. 9 shows an example of a training pipeline according to aspects of the present disclosure. The example shown includes combined embedding 900, vector graphics encoder 905, reconstructing decoder 910, vector graphics representation 915, training component 920, reconstruction loss 925, and classification loss 930.

Combined embedding 900 is an example of, or includes aspects of, the corresponding element described with reference to FIGS. 3 and 5. Vector graphics encoder 905 is an example of, or includes aspects of, the corresponding element described with reference to FIGS. 2 and 3. Reconstructing decoder 910 is an example of, or includes aspects of, the corresponding element described with reference to FIG. 3. Training component 920 is an example of, or includes aspects of, the corresponding element described with reference to FIG. 2.

In this pipeline, the system processes a training image that includes vector graphics data. Vector graphics encoder 905 encodes combined embedding 900 from the training image in a similar process to the one described with reference to FIG. 3 to generate vector graphics representation 915. Then, reconstructing decoder 910 decodes vector graphics representation 915 to generate a series of predicted vector commands, which each include a command type such as "Move", "Line", or "Curve". In some embodiments, reconstructing decoder 910 is modified with respect to the other reconstructing decoders described herein to include logit modules to generate probabilities for the training process.

In an example, reconstructing decoder 910 is modified to reconstruct sequences of a vector graphics file in one forward operation with the input of $X_{de}^{t}=\mathrm{Concat}(X_{token}^{t}, X_0^{t}) \in \mathbb{R}^{(L_{token}+L_y) \times d}$, where $X_{token}^{t} \in \mathbb{R}^{L_{token} \times d}$ is the start token, $X_0^{t} \in \mathbb{R}^{L_y \times d}$ is a placeholder of 0 for the target sequence. In this example, reconstructing decoder 910 includes both masked geometric self-attention and multi-head attention. The masked geometric self-attention sets masked dot-products to $-\infty$ and removes the geometric graph convolution network (GCN) which can prevent data leakage in the decoding stage. In some cases, a fully connected layer acquires the final logits used to compute classification loss 930.

Training component 920 then compares the predicted vector commands and their predicted types with the original commands and types from the unprocessed vector graphics training image. For example, training component 920 may compute reconstruction loss 925 as a mean squared error (MSE) loss function between the reconstructed commands predicted by reconstructing decoder 910 and the ground-truth command from the original vector graphics training image. Training component 920 may also compute classification loss 930 a cross entropy (CE) with logits between the predicted command type and the type label.

Figure 10:
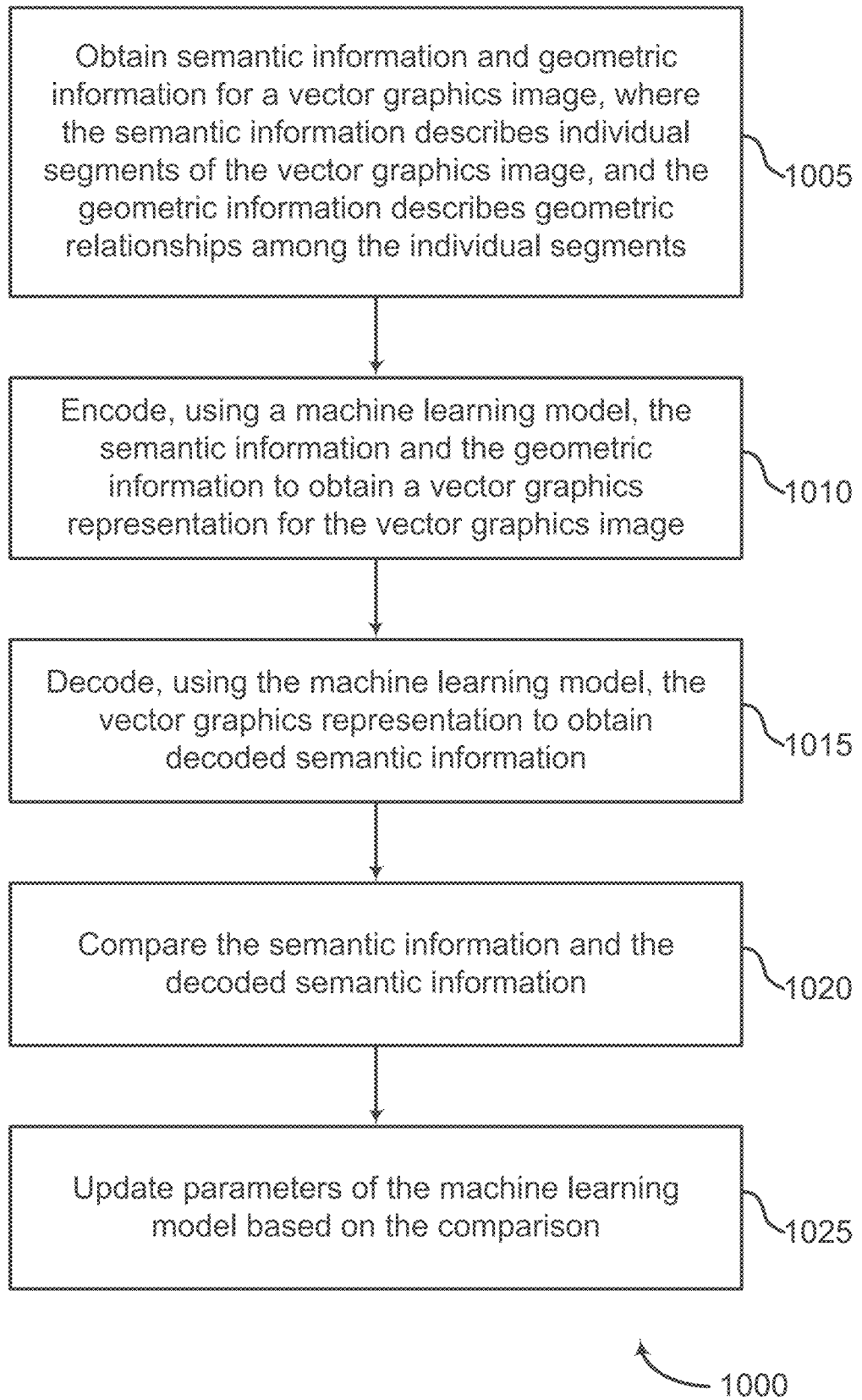
FIG. 10 shows an example of a method for image processing according to aspects of the present disclosure.

FIG. 10 shows an example of a method 1000 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system obtains semantic information and geometric information for a vector graphics image, where the semantic information describes individual segments of the vector graphics image, and the geometric information describes geometric relationships among the individual segments. In some cases, the operations of this step refer to, or may be performed by, an image processing apparatus as described with reference to FIGS. 1 and 2. Additional detail regarding the semantic information and the geometric information is provided with reference to FIG. 4.

At operation 1010, the system encodes, using a machine learning model, the semantic information and the geometric information to obtain a vector graphics representation for the vector graphics image. In some cases, the operations of this step refer to, or may be performed by, a vector graphics encoder as described with reference to FIGS. 2, 3, and 9. The system may encode both information portions according to the pipeline described with reference to FIG. 3.

At operation 1015, the system decodes, using the machine learning model, the vector graphics representation to obtain decoded semantic information. In some cases, the operations of this step refer to, or may be performed by, a reconstructing decoder as described with reference to FIGS. 3 and 9. The system may decode the vector graphics representation according to the pipeline described with reference to FIG. 3.

At operation 1020, the system compares the semantic information and the decoded semantic information. In some cases, the operations of this step refer to, or may be performed by, a training component as described with reference to FIGS. 2 and 9. The system may, for example, use a training component to compare the semantic information and the decoded semantic information that performs methods as described with reference to FIG. 9.

At operation 1025, the system updates parameters of the machine learning model based on the comparison. In some cases, the operations of this step refer to, or may be performed by, a training component as described with reference to FIGS. 2 and 9. The system may update parameters according to various methods such as backpropagation and others known in the art.

Figure 11:
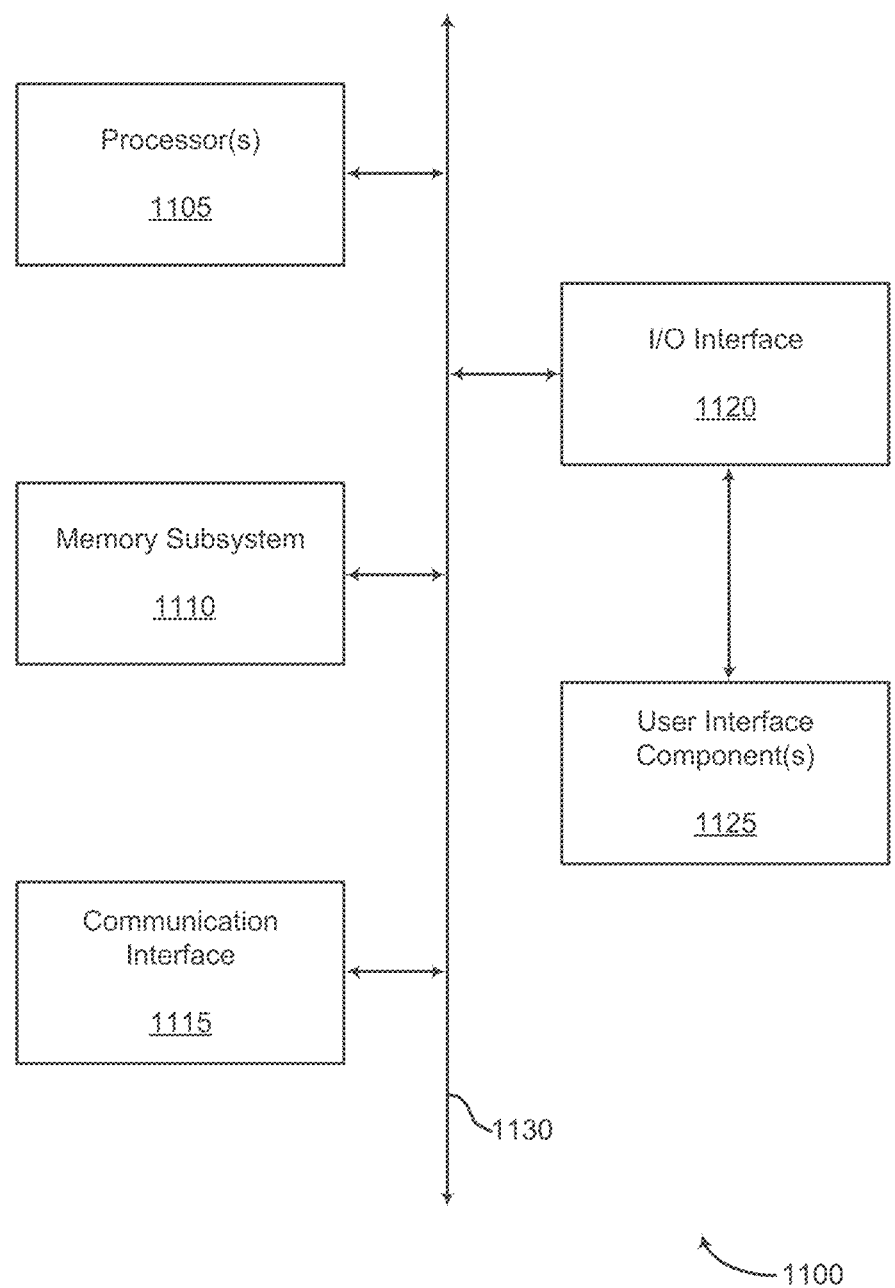
FIG. 11 shows an example of a computing device according to aspects of the present disclosure.

FIG. 11 shows an example of a computing device 1100 configured to generate and decode vector graphics representations according to aspects of the present disclosure. The example shown includes computing device 1100, processor(s) 1105, memory subsystem 1110, communication interface 1115, I/O interface 1120, user interface component(s) 1125, and channel 1130.

In some embodiments, computing device 1100 is an example of, or includes aspects of, image processing apparatus 100 of FIG. 1. In some embodiments, computing device 1100 includes one or more processors 1105 that can execute instructions stored in memory subsystem 1110 to obtain semantic information and geometric information for a vector graphics image, encode the semantic information and the geometric information to obtain a vector graphics representation for the vector graphics image; and provide a reconstructed image based on the vector graphics representation.

According to some aspects, computing device 1100 includes one or more processors 1105. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1110 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1115 operates at a boundary between communicating entities (such as computing device 1100, one or more user devices, a cloud, and one or more databases) and channel 1130 and can record and process communications. In some cases, communication interface 1115 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1120 is controlled by an I/O controller to manage input and output signals for computing device 1100. In some cases, I/O interface 1120 manages peripherals not integrated into computing device 1100. In some cases, I/O interface 1120 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1120 or via hardware components controlled by the I/O controller.

According to some aspects, user interface component(s) 1125 enable a user to interact with computing device 1100. In some cases, user interface component(s) 1125 include an audio device, such as an external speaker system, an external display device such as a display screen, an input device (e.g., a remote control device interfaced with a user interface directly or through the I/O controller), or a combination thereof. In some cases, user interface component(s) 1125 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining semantic information and geometric information for a vector graphics image, wherein the semantic information describes individual segments of the vector graphics image, and the geometric information describes geometric relationships among the individual segments;
generating an adjacency matrix based on the geometric information;
encoding the semantic information and the geometric information by performing geometric self-attention based on the semantic information and the adjacency matrix to obtain a vector graphics representation for the vector graphics image; and
providing a reconstructed image based on the vector graphics representation.

2. The method of claim 1, further comprising:
embedding the semantic information and the geometric information to obtain a combined embedding, wherein the vector graphics representation is based on the combined embedding.

3. The method of claim 1, further comprising:
performing a medial axis transform (MAT) on the semantic information to obtain the geometric information.

4. The method of claim 1, further comprising: generating a graph based on the semantic information and the adjacency matrix; and applying a graph convolution network (GCN) to the graph, wherein the geometric self-attention is based on the GCN.

5. The method of claim 1, further comprising:
decoding the vector graphics representation to obtain decoded semantic information; and
generating the reconstructed image based on the decoded semantic information.

6. The method of claim 1, further comprising:
classifying the vector graphics image based on the vector graphics representation to obtain an image type, wherein the reconstructed image is provided based on the image type.

7. The method of claim 1, further comprising:
generating an additional vector graphics representation based on an additional vector graphics image;
interpolating between the vector graphics representation and the additional vector graphics representation to obtain an interpolated vector graphics representation; and
decoding the interpolated vector graphics representation to obtain interpolated semantic information, wherein the reconstructed image is based on the interpolated semantic information.

8. The method of claim 1, further comprising:
obtaining a query vector graphics image;
encoding semantic information and geometric information from the query vector graphics image to obtain a query vector graphics representation;
comparing the vector graphics representation and the query vector graphics representation; and
providing the reconstructed image based on the comparison.

9. A method comprising:
obtaining semantic information and geometric information for a vector graphics image, wherein the semantic information describes individual segments of the vector graphics image, and the geometric information describes geometric relationships among the individual segments;
encoding, using a machine learning model, the semantic information and the geometric information to obtain a vector graphics representation for the vector graphics image;
decoding, using the machine learning model, the vector graphics representation to obtain decoded semantic information;
comparing the semantic information and the decoded semantic information; and
updating parameters of the machine learning model based on the comparison.

10. The method of claim 9, further comprising:
generating a reconstruction loss based on the comparison, where the reconstruction loss measures a difference between original commands included in the semantic information and reconstructed commands included in the decoded semantic information; and
updating parameters of the machine learning model based on the reconstruction loss.

11. The method of claim 9, further comprising:
generating a classification loss based on the comparison, where the classification loss measures a difference between command classifications included in the semantic information and reconstructed command classifications included in the decoded semantic information; and updating parameters of the machine learning model based on the classification loss.

12. The method of claim 11, wherein:

the command classifications in both the semantic information and the decoded semantic information belong to a set of command types, and wherein the set of command types includes a "Move" command, a "Line" command, and a "Curve" command.

13. An apparatus comprising:

a processor;

a memory including instructions executable by the processor;

a vector graphics encoder configured to encode semantic information and geometric information of a vector graphics image to obtain a vector graphics representation for the vector graphics image; and a decoder configured to decode the vector graphics representation into a list of reconstructed commands.

14. The apparatus of claim 13, further comprising:

a medial axis transform (MAT) component configured to perform MAT on the semantic information to obtain the geometric information.

15. The apparatus of claim 13, further comprising:

an embedding component configured to embed the semantic information and the geometric information to obtain a combined embedding.

16. The apparatus of claim 15, wherein:

the embedding component is further configured to generate an adjacency matrix.

17. The apparatus of claim 13, wherein:

the vector graphics encoder comprises a geometric self-attention component including a graph convolution network (GCN), and wherein the geometric self-attention component is configured to adjust the vector graphics representation using the GCN.

* * * * *